(12) United States Patent
Blackmore et al.

(10) Patent No.: US 6,389,478 B1
(45) Date of Patent: May 14, 2002

(54) EFFICIENT NON-CONTIGUOUS I/O VECTOR AND STRIDED DATA TRANSFER IN ONE SIDED COMMUNICATION ON MULTIPROCESSOR COMPUTERS

(75) Inventors: Robert Sidney Blackmore; Xin Chen; Rama Krishna Govindaraju, all of Poughkeepsie; Anan Vishwanath Hudli, Hopewell Junction, all of NY (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/365,696

(22) Filed: Aug. 2, 1999

(51) Int. Cl.$^7$ .............................................. G06F 15/00
(52) U.S. Cl. ..................................................... 709/236
(58) Field of Search ................................ 709/200, 201, 709/203, 217, 218, 219, 223, 224, 236; 370/311, 336, 413

(56) References Cited

U.S. PATENT DOCUMENTS

| | | | |
|---|---|---|---|
| 4,128,880 A | 12/1978 | Cray, Jr. ......................... 712/4 |
| 4,156,798 A | 5/1979 | Doelz ............................. 700/4 |
| 4,661,900 A | 4/1987 | Chen et al. ...................... 712/4 |
| 5,010,477 A | 4/1991 | Omoda et al. ................... 712/4 |
| 5,517,670 A | 5/1996 | Allen et al. ..................... 710/30 |
| 5,579,530 A | 11/1996 | Solomon et al. ............... 710/35 |
| 5,606,728 A | * 2/1997 | Keba et al. ................. 340/7.35 |
| 5,640,524 A | 6/1997 | Beard et al. ................. 712/222 |
| 5,761,706 A | 6/1998 | Kessler et al. ............... 711/118 |
| 5,787,249 A | 7/1998 | Badovinatz et al. ........ 709/201 |
| 5,805,786 A | 9/1998 | Badovinatz et al. ........... 714/4 |
| 5,822,785 A | 10/1998 | Ikeda et al. .................. 711/209 |
| 5,832,443 A | * 11/1998 | Kolesnik et al. ............ 704/500 |
| 6,236,835 B1 | * 5/2001 | Lockhart .................... 340/7.21 |

OTHER PUBLICATIONS

"Introduction to Parallel Processing and Scalable POWERparallel Systems 9076 SP1 and 9076 SP2", IBM Document No. GG24–4344–00, May 1994, pp. 27–35.

* cited by examiner

Primary Examiner—Moustafa M. Meky
(74) Attorney, Agent, or Firm—Lawrence D. Cutter; Floyd A. Gonzalez; Fleit, Kain, Gibbons, Gutman & Bongini P.L.

(57) ABSTRACT

A method for grouping I/O vectors to be transferred across a distributed computing environment comprising a plurality of processing nodes coupled together over a network. The method reduces the number of packets transmitted over a network between two or more nodes. The method includes the grouping of two or more I/O vectors into a single message, consisting of one packet with a predetermined maximum size, provided the sizes of the vectors are small enough to be placed into a single packet. The grouping method finds an efficient collection of vectors to form groups that fit inside a single packet. If two or more of the vectors can be combined so that the resulting single packet size does not exceed the predetermined maximum size, the vectors are grouped accordingly. Vectors whose size approach the predetermined maximum packet size are sent as a separate message.

12 Claims, 6 Drawing Sheets

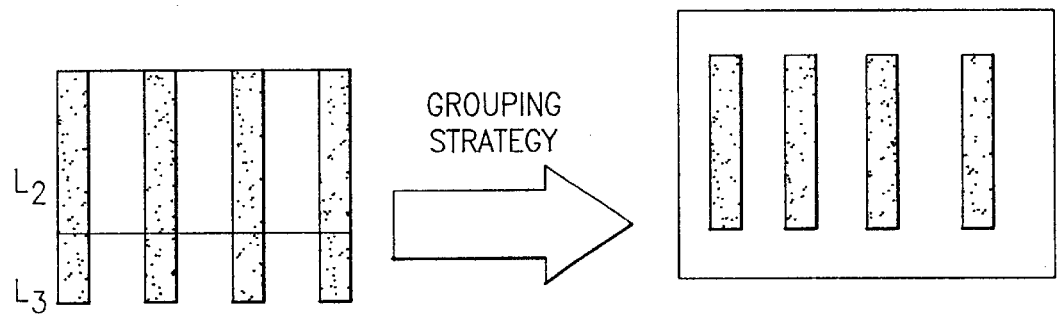
$L_2 + L_3 = L_1$
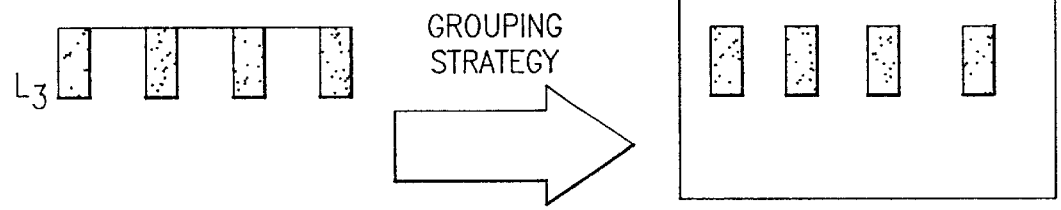
FIG.8

EFFICIENT NON-CONTIGUOUS I/O VECTOR AND STRIDED DATA TRANSFER IN ONE SIDED COMMUNICATION ON MULTIPROCESSOR COMPUTERS

CROSS-REFERENCE TO RELATED APPLICATIONS

Not applicable

COPYRIGHT NOTICE

A portion of the disclosure of this patent document contains material which is subject to copyright protection. The copyright owner has no objection to the facsimile reproduction by anyone of the patent document or the patent disclosure as it appears in the Patent and Trademark Office patent file or records, but otherwise reserves all copyright rights whatsoever.

BACKGROUND OF THE INVENTION

1. Field of the Invention

The invention disclosed broadly relates to the field of high speed computers, and more particularly relates to the transfer of noncontiguous data blocks during a one-side communications between two or more computational nodes in distributed parallel computing machines.

2. Description of the Related Art

The introduction of highly parallel distributed multiprocessor systems such as the IBM RISC System/6000 Scalable POWERparallel (SP) systems provide high reliability and availability. These systems in their simplest form can be viewed as a plurality of uniprocessor and multiprocessor computer systems coupled together to function as one coordinated system through a local area network (LAN).

Data transfer between nodes of highly parallel distributed multiprocessor systems is necessary to enable truly scalable and efficient computing. Data transfer between nodes is broadly divided into two groups, contiguous and noncontiguous data transfer. Contiguous data that is stored in adjacent locations in a computer memory. In contrast, non-contiguous data is data that is not stored is collection of adjacent locations in a computer memory device. It is well known that the transfer of noncontiguous data requires more pipeline and supporting processor overhead than the transfer of contiguous data. The transfer of noncontiguous data block is also referred to as a transfer of I/O vectors.

Typically, there are two types of I/O vectors (i) general I/O vectors where each data block (or vector) can be a different length and (ii) strided I/O vectors where each data block (or vector) is a uniform length. Referring now to FIG. 1, show is the general I/O vector transfer. Shown are four data blocks 100 in strided I/O vector 110. It is important to note that the starting addresses of the data blocks may not be symmetrically spaced as shown. Each of the four data blocks has a starting address a0, a1, a2, a3 and a length 10, 11, 12, 13. The transfer of an I/O vector 110 with four data blocks 100 from an origin task 106 to a target task 108.

Turning now to FIG. 2 there is shown a block diagram of a strided I/O vector transfer. There are three data blocks 200 (or vector) are shown. Notice that the length or block size 204 of each data block 200 is uniform. Moreover, the stride size 202 or the distance in bytes between the beginning of one block (or vector) and the beginning of the next block (or vector) is uniform. The transfer of an I/O vector 210 with data blocks 200 from a source or origin task 206 to a target task 208 with the same block size and stride size is represented. In the general vector transfer, a number, N, of vectors on the source are transferred to a corresponding number of vectors on the target, in this example 3, where the length 204 of each vector transferred is the same as the length of the corresponding vector on the target task 208. During a strided I/O vector transfer the following parameters are specified, the block size, the stride size, the number of vectors or blocks and the starting addresses of the first block on the source and the target.

The teaching of a centralized multiprocessor system, such as the system disclosed in the U.S. Pat. No. 5,640,534 issued on Jun. 18, 1997, assigned to Cray Research, with name inventors Douglas R. Beard et al. for a "Method and Apparatus for Chaining Vector Instructions," does not address the problem with vector transfer on highly parallel distributed multiprocessor systems, such as the IBM SP. More specifically the teachings of the centralized multiprocessor systems do not address the problem on highly parallel distributed multiprocessor systems of the transfer of vector data during a one-side communications between two or more computational nodes (where each node itself can comprise two or more processors). A one-sided communications is a communications where the receiver is not expecting or waiting to receive vector data communications. This data transfer is not efficient and a need exists for optimized noncontiguous data transfer on distributed multiprocessor machines like the IBM SP. These systems allows users to write application programs that run on one or more processing node to transfer vector data in a one-sided communications style. These applications programs make use of a library of APIs (Application Programming Interfaces). An API is a functional interface that allows an application program written in a high level program such as C/C++ or Fortran to use these specified data transfer functions of I/O vectors without understanding the underlying detail. Therefore a need exists for a method and a system to provide I/O vector data transfer during a one-sided communications in a highly parallel distributed multiprocessor system.

If noncontiguous I/O vector data transfer capability is not available on a distributed multiprocessor machines an application requiring noncontiguous I/O vector data transfer incurs one of two overheads: (I) pipeling and (ii) copying. To transfer non-contiguous data, user in the application program must issue of series of API data transfers. However, the use of successive API data transfer results in LAN pipelining overhead. Alternatively, the application program can be designed to copy all the noncontiguous vector data into a contiguous data buffer before initiating a data transfer. This approach results in copy overheads. Those skilled in the art would know that for efficient noncontiguous data transfer the pipeline costs and the copy costs both must be avoided. An efficient trade-off is needed between the reduction of the number of data packets that are transferred over the network and a reduction of the copy overhead is required. Accordingly, a need exists to overcome these problems by providing an efficient transfer noncontiguous data during one-sided communications.

Still, another problem with noncontiguous data transfer during a one-side communications in a highly parallel distributed multiprocessor system is that efficient packaging of noncontiguous data into fixed packet sizes must be addressed. The packaging of noncontiguous data reduces the number of data packets that must be sent across the network. Typically, minimum state information of the I/O vector data should be maintained during the node-to-node transfer over the LAN. A spillover state is created during the packing of data into packets when the data not fitting into a predefined packet size is placed into spillover state. The creation and maintenance of a spillover state when packing data into packets is inefficient and should be avoided. Therefore a need exists for a method and apparatus to provide efficient noncontiguous data transfer in a one-sided communications while maintaining minimum state information without producing a spillover state. The spillover state becomes especially difficult to handle if the packet with spillover data is to be re-transmitted.

Still, another problem with noncontiguous data transfer during a one-side communications in a highly parallel distributed multiprocessor system is that a request to transfer data from a target node to a source node, in a get operation, must include a description of the source data layout to the target. The description of the source data layout is the list of address and length of data for each vector and the number vectors in the transmission. This need to send a description of the layout of source data to a target process includes control information that needs to be sent to the target and back to the source. Accordingly, a need exists to transfer noncontiguous data while avoiding the sending of a description of the source data layout to the target.

Yet, still another problem with noncontiguous data transfer during a one-side communications in a highly parallel distributed multiprocessor system is that any method to reduce the inefficiencies of data vector into data packets must not be too time-consuming so as to offset any saving in time due to the possible reduction in the number of packets sent. Accordingly, a need exists for a method and apparatus that provides noncontiguous data transfer during a one-side communications that is less costly than the savings in time in reducing the number of packets sent.

SUMMARY OF THE INVENTION

Briefly, in accordance with the present invention, a method for grouping I/O vectors to be transferred across a distributed computing environment comprising a plurality of processing nodes coupled together over a network. The method reduces the total number of packets transmitted over a network between two nodes. The method includes the grouping of two or more I/O vectors into a single message, consisting of one packet with a predetermined maximum size, provided the sum of the sizes of the vectors are small enough to be placed into a single packet. The grouping method finds an efficient collection of vectors to form groups that fit inside a single packet. If two or more of the vectors can be combined so that the resulting single packet size does not exceed the predetermined maximum size, the vectors are grouped accordingly. Vectors whose size is greater than the predetermined maximum packet size are sent as a separate message. This results in a method to efficiently transfer strided vectors such that the total number of packets to be sent is minimized while ensuring that the amount of state information that needs to maintained is the same.

In accordance with another embodiment of the present invention, a computer readable medium is disclosed corresponding to the above method.

BRIEF DESCRIPTION OF THE DRAWINGS

The subject matter which is regarded as the invention is particularly pointed out and distinctly claimed in the claims at the conclusion of the specification. The foregoing and other objects, features, and advantages of the invention will be apparent from the following detailed description taken in conjunction with the accompanying drawings.

FIG. 8 is an illustration of the grouping for the remaining vectors of FIG. 7 according to the present invention.

DETAILED DESCRIPTION OF AN EMBODIMENT

In one embodiment, the techniques of the present invention are used in distributed computing environments in order to provide multicomputer applications that are highly-available. Applications that are highly-available are able to continue to execute after a failure of some of its components. That is, the application is fault-tolerant and the integrity of customer data is preserved. One example of highly available distributed computing environment is the IBM RISC System/6000 Scalable POWERparallel systems, also known as the SP system.

Figure 3:
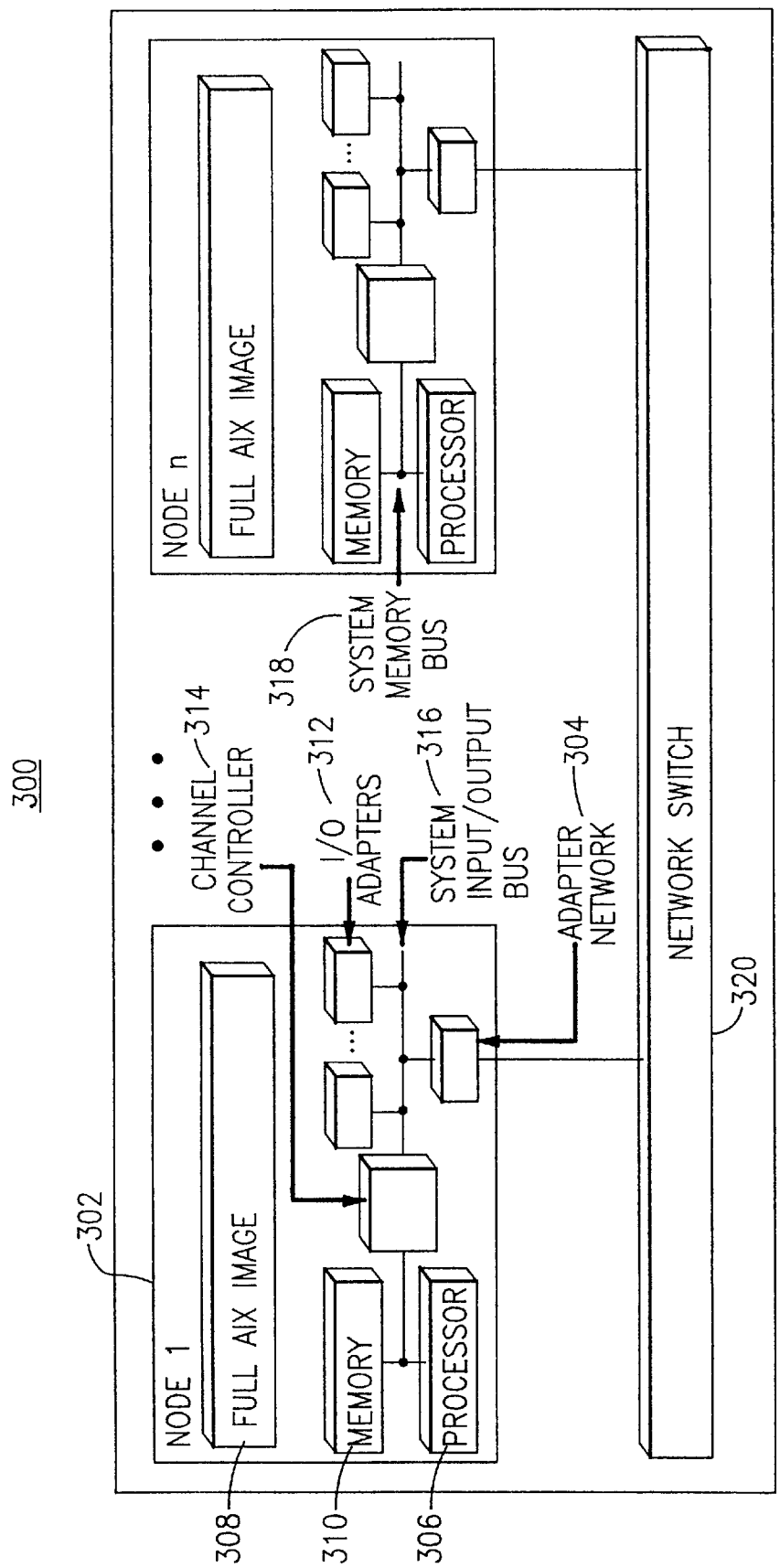
FIG. 3 depicts one example of a highly parallel distributed multiprocessor systems computing environment incorporating the principles of the present invention.

Referring now in more detail to the drawings in which like numerals refer to like parts throughout several views, FIG. 3 is a block diagram of a distributed computing environment 300 that includes a plurality of nodes 302 coupled to one another via a plurality of network adapters 304. Each node 302 is an independent computer with their own operating system image 308, memory 310 and processor(s) 306 on a system memory bus 318, a system input/output bus 316 couples I/O adapters 312 and network adapter 304. Each network adapter is linked together via a network switch 320.

In one example, distributed computing environment 300 includes N nodes 302 with one or more processors 306. In one instance, each processing node is, a RISC/6000 computer running AIX, the IBM version of the UNIX operating system. The processing nodes do not have to be RISC/6000 computers running the AIX operating system. Some or all of the processing nodes 302 can include different types of computers and/or different operating systems 308. All of these variations are considered a part of the claimed invention.

Figure 4:
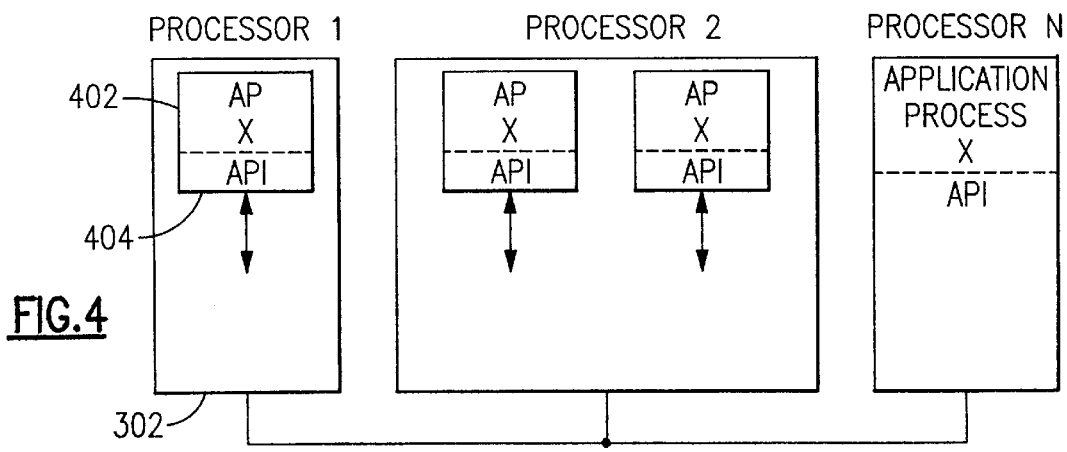
FIG. 4 depicts one example of an expanded view of a number of the processing nodes of the distributed computing environment of FIG. 3, in accordance with the principles of the present invention.

In FIG. 4 shown is an expanded view of a number of processing nodes 302 of the distributed computing environment 300 of FIG. 3, according to the present invention. In one embodiment, an application program 402 that uses Low-Level APIs 404 (LAPI) to send and receive data vectors across two or more processing nodes 302. The operation of the LAPI structures and procedures are more fully described in the following section.

Summary of Grouping I/O Vectors

Figure 5:
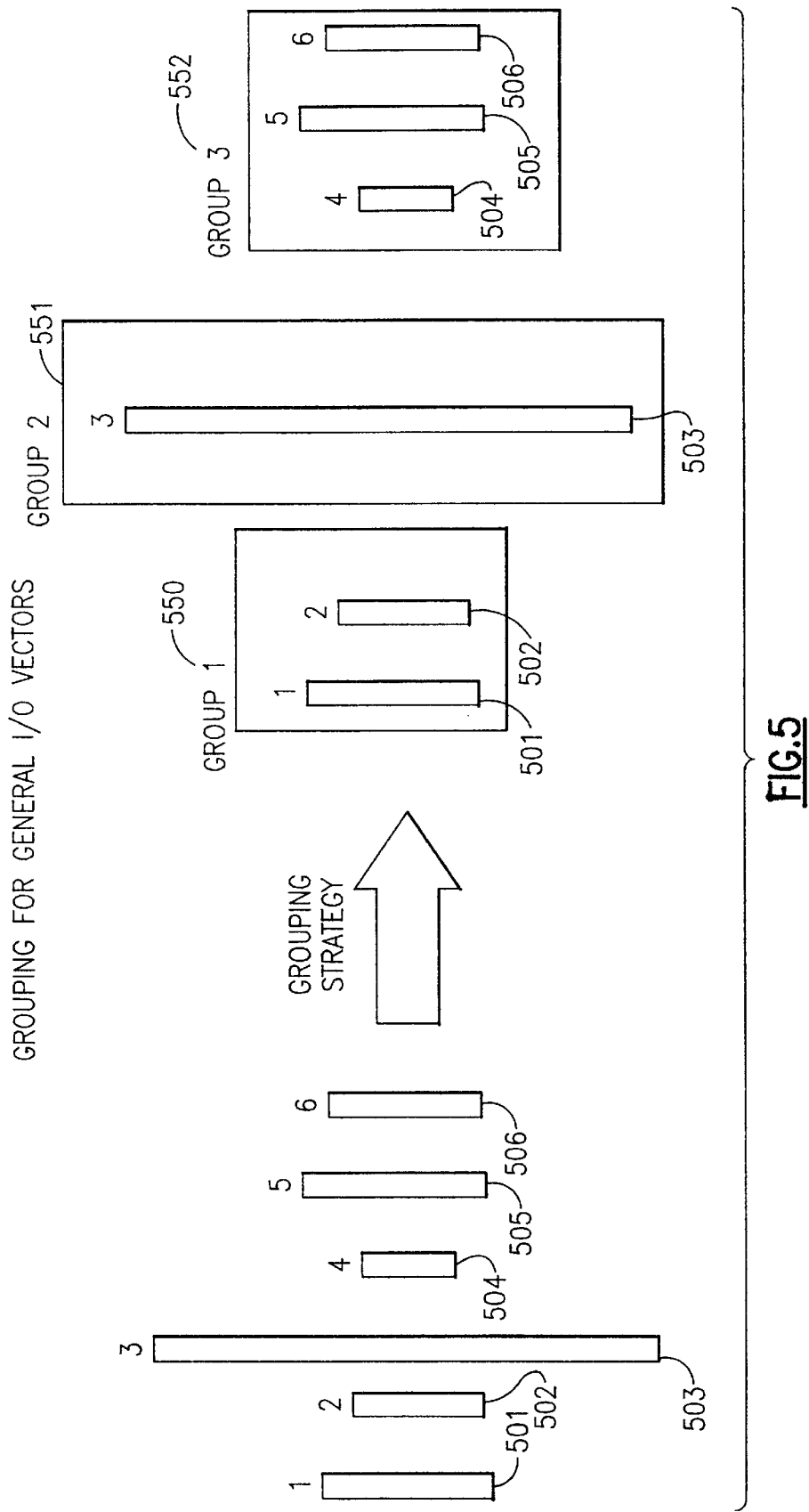
FIG. 5 is an illustration of the grouping for general I/O transfer of a data vector according to the present invention.
Figure 6:
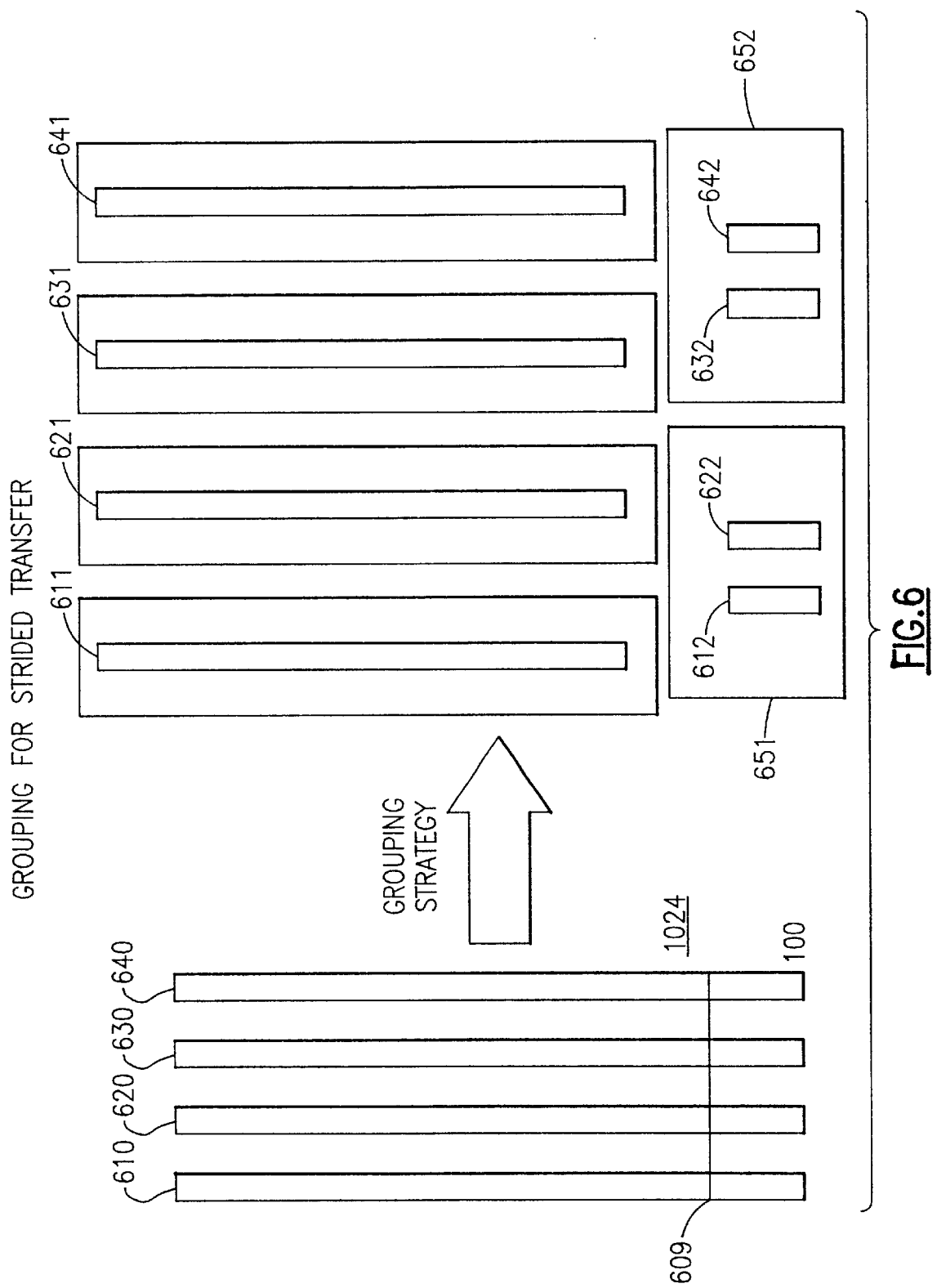
FIG. 6 is an illustration of the grouping for strided I/O transfer of a data vector according to the present invention.
Figure 7:
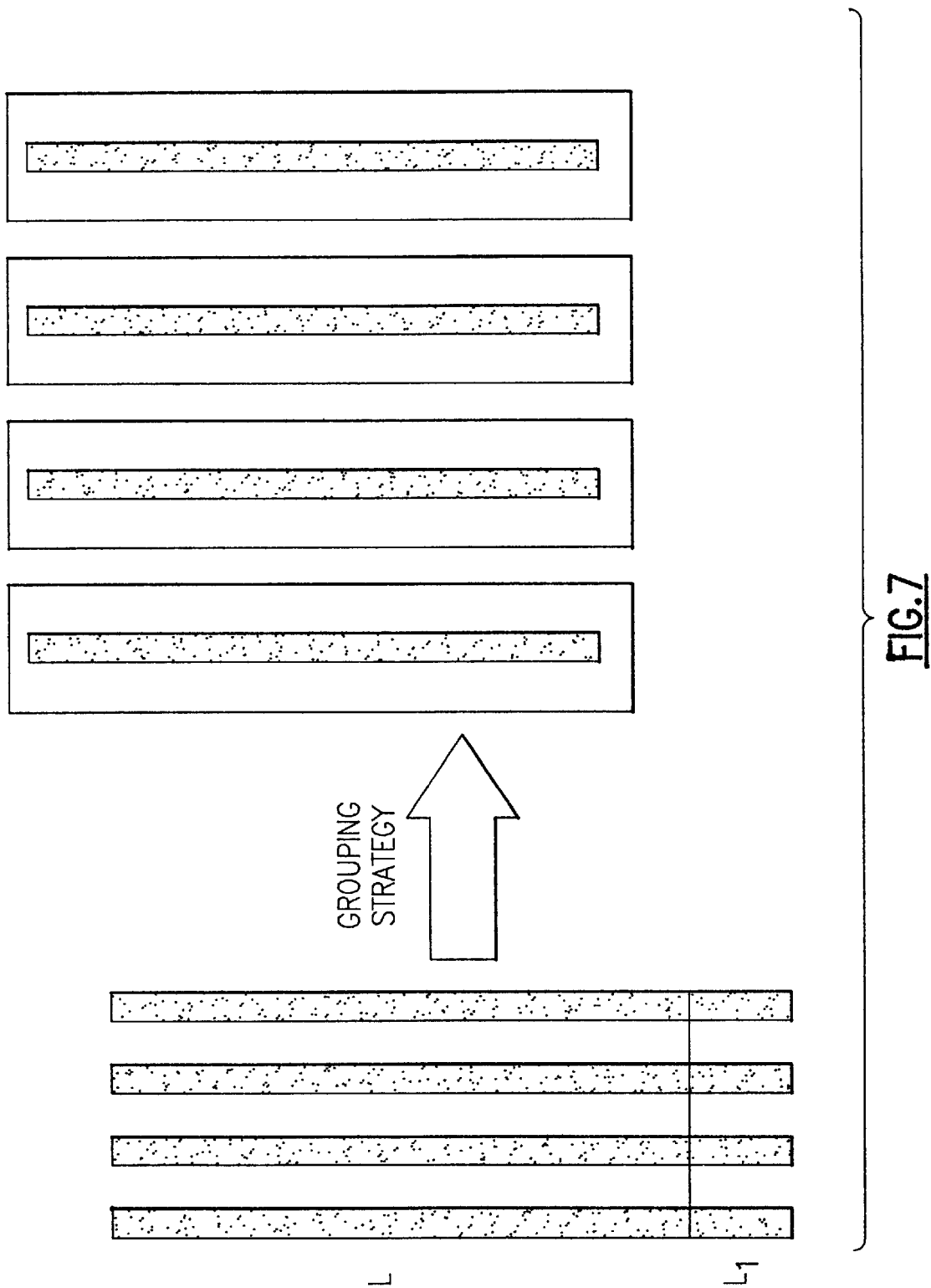
FIG. 7 is an illustration of the grouping for I/O transfer of a data vector for recursive grouping according to the present invention.

The method for efficient grouping is summarized as follows. First two or more vectors are grouped into a single message, consisting of one packet, provided the sum of the sizes of the vectors are small enough to fit in a single packet. The packing of two or more vectors into one package is defined as a packed packet. The grouping algorithm finds an efficient collection of vectors for each packed packet. If two or more vectors can be combined, the strategy groups accordingly. If a vector is large, i.e. the length of the vector is larger than a single packet size, it may be sent as a separate message. A separate message containing one vector is known as a non-packed vector. The use of packing results in a reduction in pipelining costs and a reduction in the total number of packets transmitted. FIG. 5 is an illustration of the grouping for general I/O transfer of data vector and FIG. 6 is an illustration for a strided I/O transfer of a data vector according to the present invention. In FIG. 5, it is important to notice that the grouping for the general case is according to relative vector size, where vectors 501 and 502 are collected together to form a packed packet 550, vector 503 is collected to form possible multiple non-packed packets 551 and vectors 506, 508 and 510 are grouped together to form a packed packet 552. FIG. 6 is an illustration of the groups in the strided vector transfer. Notice in the strided vector transfer that all of the relative sizes of the vectors 601, 603, 605, and 607 are identical in size. The vectors are partitioned to a predetermined maximum size as depicted by line 609. The vectors are partitioned usually to an even number of bytes, for example 1024 bytes, such that the full payload of the packet is utilized. The truncated portions of the vectors are sent as a separate strided vector as shown in FIGS. 7 and 8.

An Embodiment of the Grouping Strategy

In one embodiment, the grouping function for this present invention is embodied in a library of APIs (Application Programming Interfaces). An API is a functional interface that allows an application program 402 written in a high level program such as C/C++ or Fortran to use these specified data transfer functions of I/O vectors without understanding the underlying detail.

The current solution is to provide vector functions capability within the LAPI library so that pipelining overheads or copy overheads are not incurred. Many references are made to previous versions of LAPI. Refer to online URL www.ibm.com for more information on releases of LAPI. These structures and APIs can be shipped as part of a developer's toolkit on a CD, diskette, downloaded over the Internet or through other computer readable medium now known or later developed.

General Vector Transfer

Given a set of N vectors, that need to be transferred from the source to the target, a strategy to make the transfer efficient in terms of the number of data packets is disclosed. Let $1_1, 1_2, \ldots, 1_n$ be the number of bytes that are to be transferred for vectors 1, 2, . . . N. If the packet payload size is p, then the number of packets needed to transmit the vectors without any grouping, i.e. if they are sent as N separate messages, is:

No. of packets=⌈$1_1$/p⌉+⌈$1_2$/p⌉+ . . . +⌈$1_N$/p⌉

If, however, they are grouped into sets of vectors, $L_1$, $L_2, \ldots, L_G$, where each set $L_j$ contains one or more vectors, then each set or group of vectors can be sent as a single message. In this case, the number of packets needed would be:

No of packets=⌈$L_1$/p⌉+⌈$L_2$/p⌉+ . . . +⌈$L_G$/p⌉

One special case brings out the need for grouping. When each vector in $1_1, 1_2, \ldots, 1_N$, is such that $1_1 <<p$, $1_2 <<p, \ldots 1_N, <<p$ so that $1_1+1_2+ \ldots, 1_N \leq p$. In this case, sending each vector as a separate message would require 1 packet. The total number of packets would be N. On the other hand, grouping all the N vectors into one group would require a total of just 1 packet. Of course, the small space would be required for appropriate header information in a packet which contains such a grouped collection of vectors.

In the general case, we would like to group vectors which fit in a single packet (subject to a specified maximum number of such grouped vectors). If a vector is longer than the payload size, then it will be sent without any special packing to avoid spillover data state maintenance overheads.

Strided Vector Transfer Description

In the strided vector transfer, N vectors each of length 1 to be transferred. If each vector is sent as a separate message, then the number of packets is:

No of packets=⌈1/p⌉+⌈1/p⌉+ . . . +⌈1/p=N*⌈1/p⌉

Call this strategy 1.

If all the vectors were grouped together and sent as one message, then the number of packets sent is:

⌈N*1/p⌉

Call this strategy 2.

We would like to find out the saving in number of packets, by using strategy 2 instead of strategy 1. Clearly, if the size 1 is such that it fits exactly into an even number of packets, i.e. IF 1=k*p, then there is no need for grouping, and we will use strategy 1.

Assuming 1=k*p+r, 0<r<p, we have the number of packets for strategy 1 as:

N*⌈1/p⌉=N*⌈(k*p+r)/p⌉=N*⌈k+r/p⌉=N*(k+1)

For strategy 2, the number of packets will be:

⌈N*1/p⌉=N*(k*p+r)/p⌉=⌈(N*k*p+N*r)/p⌉=⌈N*k+/N*r/p⌉=N*k+⌈N*r/p⌉

The saving in number of packets if we were to use strategy 2 is:

N*(k+1)−(N*k+⌈N*r/p⌉)=N−⌈N*r/p⌉

Expressed as a percentage, this will be $$\frac{(N - \lceil N*r/p \rceil)}{(N*(k+1))}$$

If this last expression is smaller than a predetermined maximum specified value, then strategy 1 may be used. Else strategy 2 will be preferred.

If in fact strategy 2 turns out to be more efficient for a given case, the next problem is to find a grouping of the N vectors. One solution, which fits naturally with the existing scheme and the one proposed in the previous subsection on the strided vector transfers, is to split each vector into 2 parts. The first part, that is of length k*p, is sent as a separate message. This requires k packets. Sending the first parts of all the N vectors thus requires n*k packets. Next, the smaller second parts of the vectors, of length r, 0<r<p, are grouped such that ⌊p/r⌋ such parts are sent per packet. Clearly, the total number of packets resulting from these r length parts is ⌈N/⌊p/r⌋⌉. This modified version of strategy 2 will result in a total packet count of:

N*k+⌈N/⌊p/r⌋⌉

Although, this increases the packet count somewhat compared to strategy 2, it will be apparent to those skilled in the art that this method has the advantage of reduced processing costs in terms of spillover data state maintenance.

Description of Strided I/O Vector Grouping with Recursion

Turning now to FIGS. 7 and 8 is an illustration of the grouping for the I/O transfer of a data vector for recursive grouping, according to the present invention. In the strided vector case, where the length of each vector is not an exact multiple of the packet payload, a form of recursive "cutting" of vectors may be employed. As the FIG. 7 shows, the original length of each vector is $(L+L_1)$ where L is an exact multiple say "d" packets of packet payload and $L_1$ is less than the payload. In this figure, we assume L is the same as the packet payload. So we first send (d*four) packets corresponding to the length L of each of the four vectors. Next, the length $L_1$ that remains after length L has been transmitted, may itself be such that it is significantly smaller than the packet payload. If this happens, sending just a block of $L_1$ in one packet would not be an optimal choice. It is more efficient to send several blocks of length $L_2$, where $L_2<L_1$, in one packet to make better use of the payload. Also, $L_2$ is chosen so that $n*L_2$ is the packet payload in the typical case, where n is the number of vectors. In the example shown in FIG. 8, we end up transmitting just one packet containing four blocks of length $L_2$ using this approach, instead of the four packets that we would have sent otherwise. This process can be repeated until a stage is reached when the remaining block lengths will be small enough to package a multiple of them in one packet. In FIG. B, the small leftover blocks of length $L_3$ are packaged into one packet and transmitted. Therefore, it takes a total of (4*d+1+1)=6 packets to transmit the four original vectors. On the other hand, without this optimization scheme, we would have sent the four original vectors in 8 packets. When d is equal to one (d=1), a saving of 25% in the number of packets transmitted will result in this case by using our optimization scheme. The saving in number of packets becomes more dramatic as the number of vectors increases and as the number of (small) blocks per packet increases.

An Embodiment of Structures for General I/O Transfer

In order to simplify the description of the noncontiguous I/O data vector transfer functions the following example data structure is defined:

```
typedef   struct   {
          lapi_vectype_t    vec_type;    /* vector type */
          uint              num_vecs;    /* no of vectors */
          void              **info;      /* vector of info */
          uint              *len;        /* vector of lengths */
} lapi_vec_t
```

Depending on the vec_type the remaining fields have the interpretations as will be described for FIGS. 1 and 2 below.

Figure 2:
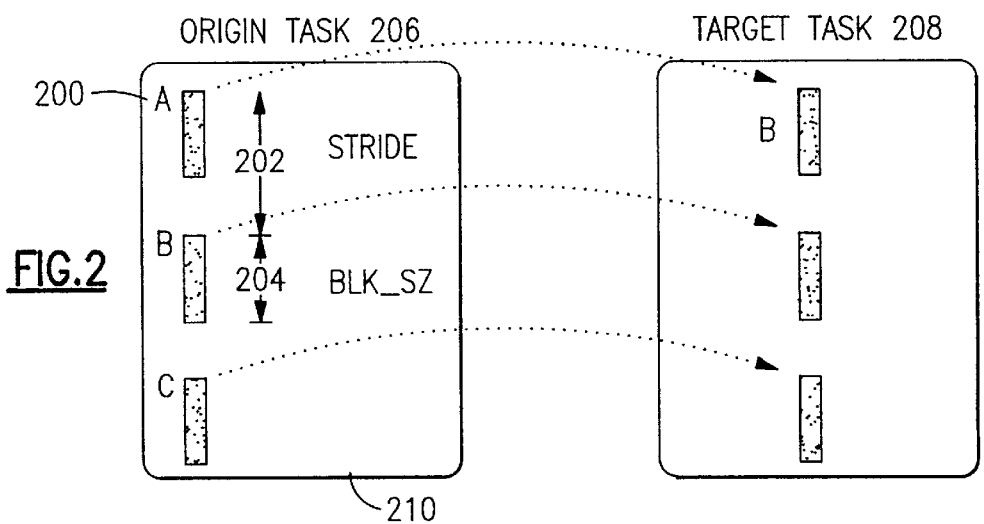
FIG. 2 is an illustration of a strided I/O transfer of a data vector according to the present invention.

Turning now to FIG. 2, for the general I/O vector transfer case. In this the vec type of the structure defined above is set to a flag denoting general I/O vector transfer. The num vecs represents the number of vectors, the info array contains num vecs buffer addresses representing the starting address for each of the vectors. The len array contains the length in bytes_for each vector respectively. The len array contains num vecs entries. The num vecs field at the origin must be the same as the num vecs field at the target. The len[i] at the origin must also be the same as len[i] at the target for 0<i<num vecs.

Figure 1:
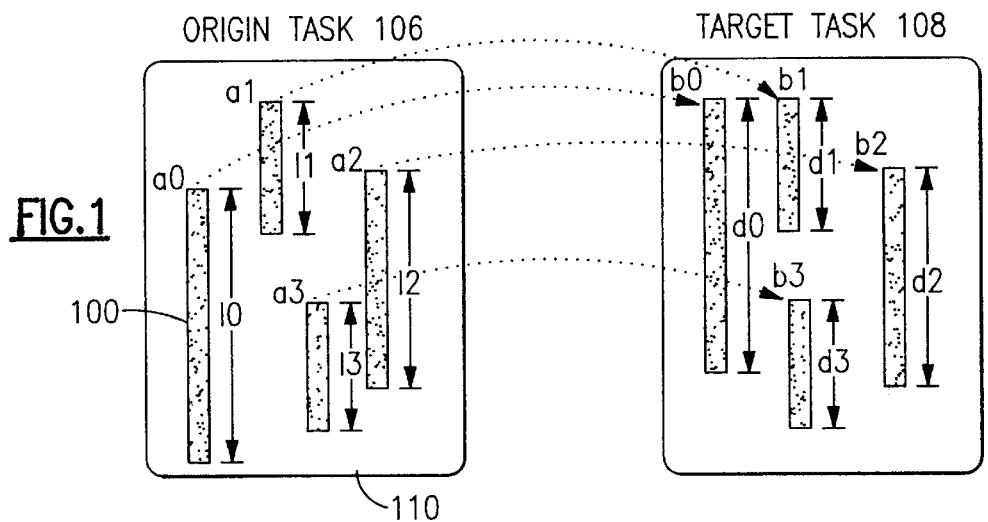
FIG. 1 is an illustration of a general I/O transfer of a data vector according to the present invention.

In FIG. 1 the general strided data transfer case. In the strided data transfer case, the vec type must be set to a flag for strided I/O vector transfer. The num vecs is set to the number of vectors. The info[0] contains the starting address of the strided vectors, info[1] contains the size of each block in bytes and info[2] contains the stride size in bytes.

The len field is a don't care.

---

One Embodiment of LAPI Putv Function

---

Purpose: Put vectors of data from the origin process address space into the target process address space
Example C Syntax:
   int LAPI_Putv(hndl, tgt, tgt_vec, org_vec, tcntr, ocntr, ccntr)
     lapi_handle_t       hndl;
     uint               tgt;
     lapi_vec_t        *tgt_vec;
     lapi_vec_t        *org_vec;
     lapi_cntr_t       *tcntr;
     lapi_cntr_t   *ocntr;
     lapi_cntr_t   *ccntr;
Parameters:

| | | |
|---|---|---|
| hndl | IN | handle specifying the LAPI context |
| tgt | IN | task id of the target process |
| tgt_vec | IN | pointer to the target I/o vector description |
| org_vec | IN | pointer to the origin I/o vector description |
| tcntr | IN | the address of the target counter. This parameter can be NULL |
| ocntr | IN/OUT | the address of the origin counter. This parameter can be NULL. \\ |
| ccntr | IN/OUT | the address of the completion counter. This parameter can be NULL. |

Description: This function transfers data from the origin process address space from locations and lengths described in the org vec to the target process address space in locations and lengths described in the tgt vec. Both structures, org vec and tgt vec, are located in the origin process address space, however the addresses of the actual vector locations in tgt vec refer to addresses in the target address space. This is a nonblocking call, in that, the calling program may not assume that the origin buffer can be changed, nor that contents of target buffers (described in tgt vec) on the target process is ready for use.

---

One Embodiment of LAPI Getv Function

---

Purpose: Copy vectors of data from a remote process to the address space of the local process)
Example C Syntax:
   int LAPI_Getv(hndl, tgt, tgt_vec, org_vec, tcntr, ocntr)
     lapi_handle_t       hndl;
     uint               tgt;
     lapi_vec_t        *tgt_vec;
     lapi_vec_t        *org_vec;
     lapi_cntr_t       *tcntr;
     lapi_cntr_t       *ocntr;
Parameters:

| | | |
|---|---|---|
| hndl | IN | handle specifying the LAPI context |
| tgt | IN | task id of the target process (origin of data) |
| tgt_vec | IN | pointer to the target I/o vector description |
| org_vec | IN | pointer to the origin I/o vector description |
| tcntr | IN | the address of the target counter. This parameter can be NULL. |
| ocntr | IN/OUT | the address of the origin counter. This parameter can be NULL. |

Description: This function transfers data from the target process address space from locations and lengths described in the tgt vec to the origin process address space in locations and lengths described in the org vec. Both structures, org vec and tgt vec, are located in the origin process address space, however the addresses of the actual vector locations in tgt vec refer to addresses in the target address space. This is a nonblocking call, in that, the calling program may not assume that the origin buffer can be changed, nor that contents of origin buffers (described in org vec) on the origin process is ready for use.

---

One Embodiment of LAPI Generic amsendv Function

---

Purpose: To invoke a user provided Active Message (AM) handler to run on a remote (target) process while transferring vectors of data.
Example C Syntax:
```
 typedef void (comp_hdlr_t) (hndl, user_info);
   lapi_handle_t  hndl      LAPI context passed in from
                            LAPI_Amsendv.
   void *         user_info; Buffer (user_info) pointer passed in from
                            header handler (void * (vhdr_hndlr_t)).
 typedef lapi_vec_t *(vhdr_hndlr_t) (hndl, uhdr, uhdr_len, len_vec,
 comp_h, uinfo);
   lapi_handle_t  hndl;     LAPI context passed in from
                            LAPI_Amsendv.
   void *         uhdr;     uhdr passed in from LAPI_Amsendv.
   uint           uhdr_len; uhdr_len passed in from
                            LAPI_Amsendv.
   uint *         len_vec[]; vector of lengths passed in
                            LAPI_Amsendv
   compl_hndlr_t ** comp_h; Function address of completion
                            handler (void (comp_hdlr_t))
                            that needs to be filled out by this
                            header handler function.
   void **        user_info; Buffer pointer (user_info) that is
                            provided by this head handler function
                            to pass to the completion handler.
 intLAPI_Generic_amsendv(hndl, tgt, hdr_hdl, uhdr, uhdr_len,
                         org_vec, tcntr, ocntr, ccntr)
    lapi_handle_t    hndl;
    uint             tgt
    void             *hdr_hdl;
    void             *uhdr;
    uint             uhdr_len;
    lapi_vec_t       *org_vec;
    lapi_cntr_t      *tcntr;
    lapi_cntr_t      *ocntr;
    lapi_cntr_t      *ccntr;
Parameters:
  hndl       IN      The handle specifying the LAPI context.
  tgt        IN      The target task number.
  hdr_hdl    IN      The pointer to the remote header handler
                     function to be invoked at the target.
  uhdr       IN      The pointer to the local header (parameter
                     list) which is passed to the handler
                     function.
  uhdr_len   IN      This parameter is valid from 0 ≦ uhdr_len ≦
                     LAPI_Qenv(MAX_UHDR_SZ).
  org_vec    IN      pointer to the origin I/o vector
  tcntr      IN      The address of target counter.
  ocntr      IN/OUT  The address of origin counter.
  ccntr      IN/OUT  The address of the completion counter.
```

Description: This function is a generic version of the LAPI_Amsendv function. The number of vectors and the lengths of the vectors on the origin and target need not match. The effect of this function is to simply transfer a given number of bytes in noncontiguous buffers specified by the origin vector structure to another number of bytes in noncontiguous buffers specified by the vector structure returned by the header handler. If the total length of the noncontiguous buffers in the target, say N, is less than the total length of the noncontiguous buffers in the origin, say M, then only the first N bytes from the origin buffers will be transferred and the remaining bytes will be discarded. This function transfers hdr hdl function pointer along with the contents of uhdr and data described in org vec from the origin to the target process tgt. When the message arrives at the target process, the header-handler hdr hdl is invoked at the tgt with the pointer to uhdr as one of the parameters.

Although a specific embodiment of the invention has been disclosed, it will be understood by those having skill in the art that changes can be made to this specific embodiment without departing from the spirit and scope of the invention. The scope of the invention is not to be restricted, therefore, to the specific embodiment, and it is intended that the appended claims cover any and all such applications, modifications, and embodiments within the scope of the present invention.

What is claimed is:

1. A method for efficiently transferring noncontiguous I/O vectors and strided I/O vectors across a distributed computing environment comprising a plurality of processing nodes coupled together over a network, the method comprising the steps of:
    grouping vectors to be transferred into a series of transmission packets, wherein each transmission packet is a predetermined maximum size and each transmission packet comprises a single group of:
        one vector if the vector size is greater than the predetermined maximum size of the transmission packet; and
        two or more vectors if the resulting packet size is not greater than the predetermined maximum size of the transmission packet;
    transmitting the series of transmission packets across the network from a source node to at least one destination node.

2. The method according to claim 1, further comprises the step of
    identifying if the I/O vectors to be transferred are strided vectors and if the vectors are strided vectors than performing the sub-steps comprising:
        a) cutting the size of each strided vector to a first portion to fit a multiple of the maximum size of each transmission packet and a second portion representing the remaining vector;
        b) transmitting each first portion in a separate transmission packet; and
        c) recursively carrying out sub-steps a and b until the remaining vectors are small enough to be grouped into a single transmission packet and transmitted.

3. The method according to claim 1, further comprising the step of:
    identifying if the I/O vectors to be transferred are strided vectors, where the length of each strided vector is $L+L_1$, where L is an exact multiple of the transmission packets and $L_1$ is smaller in size than the maximum size of each transmission packet and if the vectors are strided vectors than performing the sub-steps comprising:
        a) cutting the size of each strided vector to a first portion L to fit a multiple of the maximum size of each transmission packet and a second portion $L_1$ representing the remaining vector;
        b) transmitting each first portion L in a separate transmission packet; and
        c) recursively cutting the size of each second portion $L_1$,
    where in $L_1=L_2+L_3$, and $L_2$ is equal to the number of strided I/O vectors to be transferred, n, so that size of $n*L_2$ fits into one transmission packet for transmission and the remaining portions $L_3$ are grouped into at least one remaining transmission packet for transmission.

4. The method according to claim 2, further comprising the steps of:
    receiving a message from a source node at a destination node; and storing each vector received if the message comprises one or more vectors which have been placed in a single group without the need of storing additional copies of each vector received.

5. A method for grouping noncontiguous I/O vectors and strided I/O vectors to be transferred across a distributed computing environment comprising a plurality of processing nodes coupled together over a network, the method comprising the steps of:

identifying if the I/O vectors to be transferred are strided vectors or general vectors;

grouping each strided vector to be transferred into one or more transmission packets, wherein each transmission packet comprises a predetermined maximum size, the grouping comprising the sub-steps of:

cutting each strided vector to the predetermined maximum size of the transmission packet to form a first portion and a second remaining portion;

packing each first portion into a series of transmission packets;

grouping one or more second portions into a series of transmission packets so that the resulting combination of the second portions does not exceed the predetermined maximum size of the transmission packet;

grouping each general vector to be transferred into one or more transmission packets, wherein each transmission packet comprises a predetermined maximum size, the grouping comprising the sub-steps of:

packing one vector into a packet if the size of the vector does not exceed the predetermined maximum size of the transmission packet;

grouping two or more vector into a packet if the size of the resulting packet does not exceed the predetermined maximum size of the transmission packet.

6. A computer readable medium comprising programming instructions for transferring noncontiguous I/O vectors and strided I/O vectors across a distributed computing environment comprising a plurality of processing nodes coupled together over a network, the programming instructions comprising:

grouping vectors to be transferred into a series of transmission packets, wherein each transmission packet is a predetermined maximum size and each transmission packet comprises a single group of:

one vector if the vector size is not greater than the predetermined maximum size of the transmission packet; and two or more vectors if the resulting packet size is not greater than the predetermined maximum size of the transmission packet;

transmitting the series of transmission packets across the network from a source node to at least one destination node.

7. The computer readable medium according to claim 6, further comprises the programming instructions of:

identifying if the I/O vectors to be transferred are strided vectors and if the vectors are strided vectors than performing the programming instructions of:

a) cutting the size of each strided vector to a first portion to fit a multiple of the maximum size of each transmission packet and a second portion representing the remaining vector;

b) transmitting each first portion in a separate transmission packet; and c) recursively carrying out sub-steps a and b until the remaining vectors are small enough to be grouped into a single transmission packet and transmitted.

8. The computer readable medium according to claim 6, further comprises the programming instructions of:

identifying if the I/O vectors to be transferred are strided vectors, where the length of each strided vector is $L+L_1$, where L is an exact multiple of the transmission packets and $L_1$ is smaller in size than the maximum size of each transmission packet and if the vectors are strided vectors than performing the programming instructions of:

a) cutting the size of each strided vector to a first portion L to fit a multiple of the maximum size of each transmission packet and a second portion $L_1$ representing the remaining vector;

b) transmitting each first portion L in a separate transmission packet; and c) recursively cutting the size of each second portion $L_1$, where in $L_1=L_2+L_3$, and $L_2$ is equal to the number of strided I/O vectors to be transferred, n, so that size of $n*L_2$ fits into one transmission packet for transmission and the remaining portions $L_3$ are grouped into at least one remaining transmission packet for transmission.

9. The computer readable medium according to claim 6, further comprises the programming instructions of:

receiving a message from a source node at a destination node; and storing each vector received if the message comprises one or more vectors which have been placed in a single group without the need of storing additional copies of each vector received.

10. A computer readable medium comprising programming instructions for grouping noncontiguous I/O vectors and strided I/O vectors to be transferred across a distributed computing environment comprising a plurality of processing nodes coupled together over a network, the programming instructions comprising:

identifying if the I/O vectors to be transferred are strided vectors or general vectors;

grouping each strided vector to be transferred into one or more transmission packets, wherein each transmission packet comprises a predetermined maximum size, the grouping comprising the programming instructions of:

cutting each strided vector to the predetermined maximum size of the transmission packet to form a first portion and a second remaining portion;

packing each first portion into a series of transmission packets;

grouping one or more second portions into a series of transmission packets so that the resulting combination of the second portions does not exceed the predetermined maximum size of the transmission packet;

grouping each general vector to be transferred into one or more transmission packets, wherein each transmission packet comprises a predetermined maximum size, the grouping comprising the sub-steps of:

packing one vector into a packet if the size of the vector does not exceed the predetermined maximum size of the transmission packet;

grouping two or more vector into a packet if the size of the resulting packet does not exceed the predetermined maximum size of the transmission packet.

11. A computer readable medium according to claim 10, wherein instructions for grouping I/O vectors to be transferred across a distributed computing environment comprising a plurality of processing nodes coupled together over a network are the programming instructions that are part of the LAPI (Low-Level Application Programming Interface) of the IBM RISC System/6000 Scalable Power Parallel Systems.

12. A computer readable medium comprising programming instructions for noncontiguous I/O vectors and strided I/O vectors transfer from target to a source grouping in a distributed computing environment comprising a plurality of processing nodes coupled together over a network, the programming instructions comprising:

identifying if the I/O vectors to be transferred are strided vectors or general vectors;

grouping information of each strided vector to be transferred into one or more transmission packets, wherein each transmission packet comprises a predetermined maximum size, the grouping comprising the instructions of cutting each strided vector to be predetermined maximum max size of the transmission packet to form a first portion and a second remaining portion;

packing each first portion into a series of transmission packets;

grouping one or more second portions into a series of transmission packets so that resulting combination of the second portions does not exceed the predetermined maximum max size of the transmission packet;

grouping each general vector to be transferred into one or more transmission packets, wherein each transmission packet comprises a predetermined maximum size, the grouping comprising the instructions of:

packing each first portion into a series of transmission packets;

grouping two or more vector into a packet if the size of the resulting packet does not exceed the predetermined maximum size of the transmission packet.

* * * * *

UNITED STATES PATENT AND TRADEMARK OFFICE
CERTIFICATE OF CORRECTION

PATENT NO. : 6,389,478 B1
DATED : May 14, 2002
INVENTOR(S) : Blackmore et al.

It is certified that error appears in the above-identified patent and that said Letters Patent is hereby corrected as shown below:

<u>Title page,</u>
Item [75], Inventors, from "Xin Chen" to -- Xin (Amy) Chen --; and from "Anan Vishwanath Hudli" to -- Anand Vishwanath Hudli --

<u>Column 2,</u>
Line 41, from "available on a distributed" to -- available on distributed --
Line 43, from "pipeling" to -- pipelining --
Line 57, from "transfer noncontiguous" to -- transfer of noncontiguous --

<u>Column 3,</u>
Line 40, from "network." to -- network is described. --
Line 56, from "to maintained" to -- to be maintained --

<u>Column 5,</u>
Line 57, from "$\lceil 1_1/p \rceil + \lceil 1_2/p + ... + \lceil 1_N/p \rceil$" to -- $\lceil 1_1/p \rceil + \lceil 1_2/p \rceil + ... + \lceil 1_N/p \rceil$ --
Line 64, from "No of packets=" to -- No. of packets= --

<u>Column 6,</u>
Line 1, from "<<p,...1" to -- <<p,...,1 --
Line 18, from "$\lceil 1/p \rceil + \lceil 1/p \rceil + ... + \lceil 1/p = N * \lceil 1/p \rceil$" to -- $\lceil 1/p \rceil + \lceil 1/p \rceil + ... + \lceil 1/p \rceil = N * \lceil 1/p \rceil$ --
Line 25, from "number of packets," to -- number of packets --
Line 60, from "$\subset p/r \rfloor$" to -- $\lfloor p/r \rfloor$ --
Line 62, from "$\lceil N/\lfloor p/r \rfloor \lceil.$" to -- $\lceil N/\lfloor p/r \rfloor \rceil.$ --

<u>Column 8,</u>
Line 20, from "I/o" to -- I/O --
Line 21, from "I/o" to -- I/O --
Line 53, from "I/o" to -- I/O --
Line 54, from "I/o" to -- I/O --

<u>Column 9,</u>
Line 44, from "I/o" to -- I/O --

<u>Column 10,</u>
Line 31, from "strided vectors than" to -- strided vectors then --
Line 49, from "strided vectors than" to -- strided vectors then --

UNITED STATES PATENT AND TRADEMARK OFFICE
CERTIFICATE OF CORRECTION

PATENT NO. : 6,389,478 B1
DATED : May 14, 2002
INVENTOR(S) : Blackmore et al.

It is certified that error appears in the above-identified patent and that said Letters Patent is hereby corrected as shown below:

Column 11,
Line 32, from "two or more vector" to -- two or more vectors --
Line 57, from "strided vectors than" to -- strided vectors then --

Column 12,
Line 8, from "strided vectors than" to -- strided vectors then --
Line 61, from "more vector" to -- more vectors --

Column 14,
Line 16, from "more vector" to -- more vectors --

Signed and Sealed this

Twenty-ninth Day of October, 2002

*Attest:*

JAMES E. ROGAN
*Attesting Officer*   *Director of the United States Patent and Trademark Office*